(12) United States Patent
Van Gorkom et al.

(10) Patent No.: US 8,390,546 B2
(45) Date of Patent: Mar. 5, 2013

(54) LINE-AT-A-TIME FOIL DISPLAY

(75) Inventors: Ramon Pascal Van Gorkom, Holstlaan (NL); Peter Alexander Duine, Holstlaan (NL); Volker Schoellmann, Holstlaan (NL); Ruediger Johannes Lange, Holstlaan (NL); Siebe Tjerk De Zwark, Holstlaan (NL)

(73) Assignee: Rambus Inc., Sunnyvale, CA (US)

( * ) Notice: Subject to any disclaimer, the term of this patent is extended or adjusted under 35 U.S.C. 154(b) by 43 days.

(21) Appl. No.: 12/984,471

(22) Filed: Jan. 4, 2011

(65) Prior Publication Data

US 2011/0165812 A1 Jul. 7, 2011

Related U.S. Application Data

(63) Continuation of application No. 10/557,343, filed as application No. PCT/IB2004/050695 on May 14, 2004, now Pat. No. 7,889,162.

(30) Foreign Application Priority Data

May 22, 2003 (EP) ..................... 03101481

(51) Int. Cl.
*G09G 3/34* (2006.01)

(52) U.S. Cl. ........................................ 345/85

(58) Field of Classification Search ............ 345/84, 345/85, 108
See application file for complete search history.

(56) References Cited

U.S. PATENT DOCUMENTS

| 5,106,181 A * | 4/1992 | Rockwell, III ............... 385/2 |
| 5,771,321 A * | 6/1998 | Stern ........................... 385/31 |
| 7,889,162 B2 * | 2/2011 | Van Gorkom et al. ........ 345/85 |
| 2001/0043171 A1 * | 11/2001 | Van Gorkom et al. ...... 345/75.1 |

FOREIGN PATENT DOCUMENTS

| EP | 0381479 | 8/1990 |
| EP | 0675477 | 10/1995 |
| EP | 0867854 | 9/1998 |
| WO | WO 00/38163 | 6/2000 |
| WO | WO 01/63588 | 8/2001 |

OTHER PUBLICATIONS

International Search Report and Written Opinion of the International Searching Authority issued in WO 2004/107298 dated Nov. 22, 2005 (PCT/IB2004/050695), 8 pages (enclosed).

* cited by examiner

*Primary Examiner* — Yong H Sim
(74) *Attorney, Agent, or Firm* — Renner, Otto, Boisselle & Sklar, LLP

(57) ABSTRACT

A display device comprising a light guide (12), a front plate (14), and an intermediate electromechanically operable foil (16). Two electrode layers (22, 23) are arranged on either side of the foil (16) to induce electrostatic forces on the foil (16) and to bring selected portions of the foil into contact with the light guide (12), thereby extracting light from the light guide (12). The second electrode layer (22) is arranged on the opposite side of the light guide (12) with reference to the foil (16), and separated from the light guide (12) by means of a refractive layer (28). As no electrode layer is required on the light guide itself, the light path of rays extracted from the light guide is cleaner, and the absorption of light is reduced. The light guide can have a thickness such that the light extracted from the light guide per unit length is sufficient to allow for line-at-a-time addressing.

4 Claims, 4 Drawing Sheets

LINE-AT-A-TIME FOIL DISPLAY

CROSS-REFERENCE TO RELATED APPLICATIONS

This Application is a Continuation of, commonly assigned, U.S. patent application Ser. No. 10/557,343 entitled "LINE-AT-A-TIME FOIL DISPLAY", filed on Nov. 21, 2005, now U.S. Pat. No. 7,889,162, issued Feb. 15, 2011, which claims priority to PCT Application number PCT/IB2004/050695, filed May 14, 2004, and to European Application No. 03101481.4, filed May 22, 2003, the disclosures of which are hereby incorporated herein by reference.

TECHNICAL FIELD

The present invention relates to a display device having a light guide optically coupled to a light source, a front plate facing the light guide, a first electrode layer arranged on said front plate, a second electrode layer arranged on the opposite side of the light guide with respect to the front plate and separated from the light guide by means of a refractive layer, and a movable element provided with a third electrode layer arranged between the light guide and the front plate. The electrode layers are arranged to induce electrostatic forces on the element and to bring selected portions of it into contact with the light guide, thereby extracting light from the light guide.

BACKGROUND OF THE INVENTION

Line-at-a-time addressing is a technique well known in the art (e.g. passive matrix OLED displays), and is based upon selecting one line of the display at a time, consecutively during the frame period, and while each line is selected addressing the pixels in this line. As a consequence, each pixel can only be addressed for a fraction of the frame period (i.e. the frame period divided by number of lines). Therefore, line-at-a-time addressing requires quite a large maximum intensity per pixel, in order to obtain the desired light output.

BRIEF SUMMARY OF THE INVENTION

A conventional foil display is shown in FIG. 1, and comprises a light guide 1 in the form of an edge lit glass plate and a non-lit front plate 2, with a scattering foil 3 clamped in between. On both plates there are respective sets of parallel electrodes 4, 5 which are arranged perpendicularly with respect to each other. By application of voltages to appropriate electrodes on the light guide, the front plate and the foil, it is possible to generate two electrostatic fields with the field vectors directed towards the light guide and the front plate respectively. The balancing of these two electrostatic forces in combination with the elastic force of the foil is used to attract the foil to either the light guide or the front plate. Typically, the foil can be attracted towards the light guide using a column electrode and towards the front plate using a row electrode. When the foil is brought into contact with the light guide, light is extracted and emitted through the front plate. If preferred, the front plate can include a color filter and/or a black matrix.

In order to minimize absorption, the light guide is made relatively thick, so as to reduce the number of reflections by the light guide surfaces. This means that the amount of light that can be extracted from the light guide per unit length, which is proportional to the number of times each light ray is reflected, is relatively small. Therefore, line-at-a-time addressing is not possible. Simply put, with light rays traveling in the column direction, each light ray does not hit all the pixels in a column.

Instead, a sub-frame addressing scheme is used, making use of the bi-stability of the foil. This is described in WO 00/38163, with several positive effects, the disclosure of which is hereby incorporated herein by reference.

In practice, however, the control of the bi-stable switching is difficult, as non-homogeneous switching curves can cause certain pixels to remain ON or OFF. It also requires a large number of pixel switching events during addressing. Additionally, sub-frame addressing requires complex and expensive electronics.

An object of the present invention is therefore to provide an improved foil display device, allowing a line-at-a-time addressing scheme.

This and other objects are achieved by a device of the kind mentioned by way of introduction, wherein the light guide has a thickness such that the light extracted from the light guide per unit length is sufficient to allow for line-at-a-time addressing.

The invention is based on the realization that when the second electrode layer is arranged on the far side of the light guide, the light path of rays extracted from the light guide is cleaner, and the absorption of light in the light guide is reduced. This reduced absorption allows for a thinner light guide, in turn resulting in more reflections and hence larger available light intensity per unit length. Even if each light ray is reflected more often than in conventional foil displays, the absorption will be kept at a reasonable level.

The refractive layer is intended to ensure the total internal reflection of the light guide, and has a refractive index smaller than the refractive index of the light guide. It can be deposited on the light guide, and the second electrode layer can then be deposited on the refractive layer. Alternatively, the second electrode layer is arranged on a back plate, arranged on the opposite side of the light guide with reference to the front plate, and the refractive layer is then formed by an air gap separating the back plate from the light guide.

Due to the increased distance between the foil and the electrodes on the far side of the light guide, a large voltage is needed to attract the foil to the active plate. However, by minimizing the distance between the light guide and the second electrode layer, the required voltage can be limited.

The bi-stable character of the switching characteristics is not required for the addressing of the display, and the design can be modified to achieve a smaller bi-stable region so that addressing pulses of small magnitude may be employed.

For example, the light guide can be glass plate having a thickness of 0.05-1 mm, and preferably 0.1-0.3 mm.

According to a first embodiment, the second electrode layer is unstructured, while the first and third electrode layers are structured into sets of electrodes. These sets of electrodes can then be used to address the foil. In order to facilitate addressing, the first electrode layer can comprise a first set of parallel electrodes while the third electrode layer can comprises a second set of parallel electrodes, orthogonal to said first set. Thereby, a foil electrode layer divided into parallel electrodes is arranged in between one unstructured electrode and one set of parallel electrodes, perpendicular to the foil electrodes. This allows for addressing of individual pixels, defined by intersections of the electrodes.

An advantage with this arrangement is that the voltage applied to the second electrode layer, which must be quite high (typically several hundred V to a few kV) due to the distance to the foil electrode, now can be a constant DC during each frame, possibly with reversing polarity for different frames. Thereby high frequency switching with high voltages is avoided.

In this case, any spacers arranged between the front plate and the foil and/or between the light guide and the foil preferably extend perpendicularly with the electrodes on the foil. This accounts for less stringent alignment.

According to a second embodiment, the third electrode layer is unstructured, while the first and second electrode layers are structured into sets of electrodes. These sets of electrodes can then be used to address the foil. Again, as in the first embodiment, the electrode sets can comprise parallel electrodes orthogonal to each other. Thereby, two sets of parallel electrodes, orthogonal against each other, are arranged on each side of the foil electrode, in this case unstructured, to allow for addressing of individual pixels, defined by intersections of the electrodes.

With line-at-a-time addressing, the time available for pulse width modulation of the column pulses is limited. In order to achieve a desired resolution the shortest pulses must have a duration in the order of 1 µs. Therefore, it may be advantages to provide the display device with means for modulating the intensity of the light source, as described in PHNL 021414, incorporated herewith by reference.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
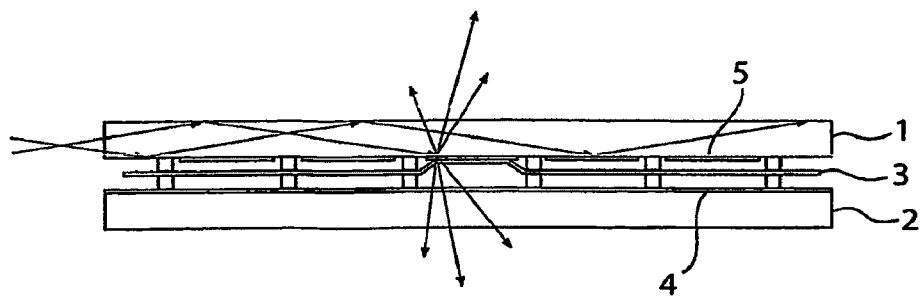
FIG. 1 is a schematic cross section of a display device according to prior art.
Figure 2:
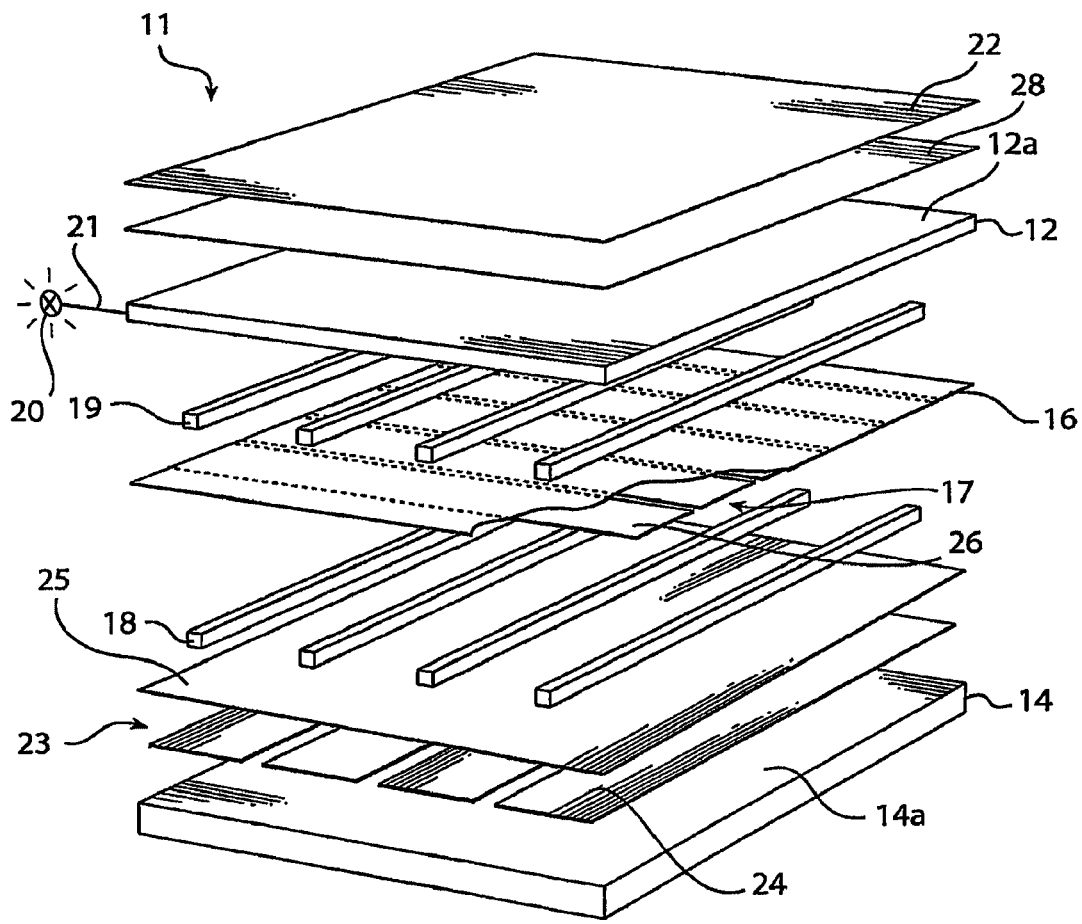
FIG. 2 is an exploded view of a display device according to a first embodiment of the present invention.
Figure 3:
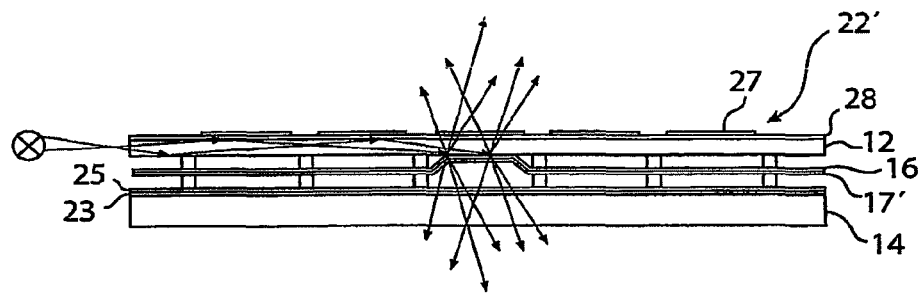
FIG. 3 is a schematic cross section of a display device according to a second embodiment of the present invention.

FIGS. 2 and 3 shows a foil display device 11 according to two different embodiments of the invention. Identical reference numerals have been used for corresponding elements of the device. With reference primarily to FIG. 2, which best illustrates the design of the display device, it comprises a light guide (active plate) 12, and a front plate 14. The front plate 14 is here a glass plates of suitable thickness, e.g. 2 mm, while the light guide 12 is a thinner glass plate preferably having a thickness range of 0.05-1 mm, in a preferred example 0.1-0.3 mm.

An electromechanically operable foil 16 is clamped in between the front plate 14 and the light guide 12. The foil can be of a flexible, light scattering material, such as parylene, with an electrode layer 17 disposed thereon, on the side facing the front plate 14. Spacers 18, 19 are arranged on each side of the foil 16, to distance it from the front plate 14 and the light guide 12.

Two further electrode layers 22, 23 are provided in the device 11, one layer 22 on the light guide 12, on the side 12a facing away from the foil 16, and one layer 23 on the face 14a of the front plate 14 facing the foil 16. An insulating layer 25 is arranged on the electrode layer 23 on the front plate 14.

All electrode layers can be formed by ITO layers disposed on the mentioned surfaces.

Light from a light source, such as an LED 20, is coupled into the light guide 12 using a lens system 21. Preferably, an optical feeding system, such as for example a feeding prism, is used, in order to couple as much light as possible into the light guide. The light is confined inside the glass plate by total internal reflection. Light may be extracted from the guide by bringing the scattering foil 16 into contact with the light guide by means of applying appropriate voltages to the electrode layers 17, 22, 23, as will be further described below.

According to the embodiment shown in FIG. 2, the electrode layer 22 on the front plate 14 contains a first set of parallel electrodes 24 (column electrodes), and the electrode layer 17 on the foil 16 contains a second set of parallel electrodes 26 (row electrodes), perpendicular with respect to the first set. The crossings of the electrodes of each set define the pixels of the display. The third electrode layer 23, on the far side 12a of the light guide 12, is unstructured, i.e. not divided into smaller electrodes.

Preferably, the spacers 18, 19 are arranged perpendicularly with respect to the electrodes 26 on the foil 16, i.e. in parallel with the electrodes on the front plate 14. This relaxes the requirements on alignment of the spacers.

The electrode layer 22 on the light guide 12 is separated from the light guide 12 by a layer 28 having a refractive index such that light coupled in the light guide is reflected by total internal reflection, and does not enter the layer 28, nor the electrode layer 22. This reduces absorption.

According to the embodiment shown in FIG. 3, the first set of parallel electrodes 24 (column electrodes) is again arranged on the front plate 14, while the second set of parallel electrodes 27 here is arranged on the light guide 12. In this case, the electrode layer 17' on the foil 16 is unstructured, facilitating manufacturing.

According to the invention, the distance between the foil 16 and the electrode layer 22 is increased compared to a conventional foil display. For example, a thickness of 100 μm instead of 1 μm with an $\epsilon_r$=5 yields an approximately 20 times higher voltage. This means that instead of a voltage of 20 V, 400 V must be applied to the electrode layer 22 in order to generate an attractive force on the foil 16.

Addressing of a display device according to the invention is preferably performed sequentially row by row. A timing diagram of addressing pulses is shown in FIG. 4, and switching curves for each of the described embodiments is described in FIGS. 5a and 5b.

Figure 4:
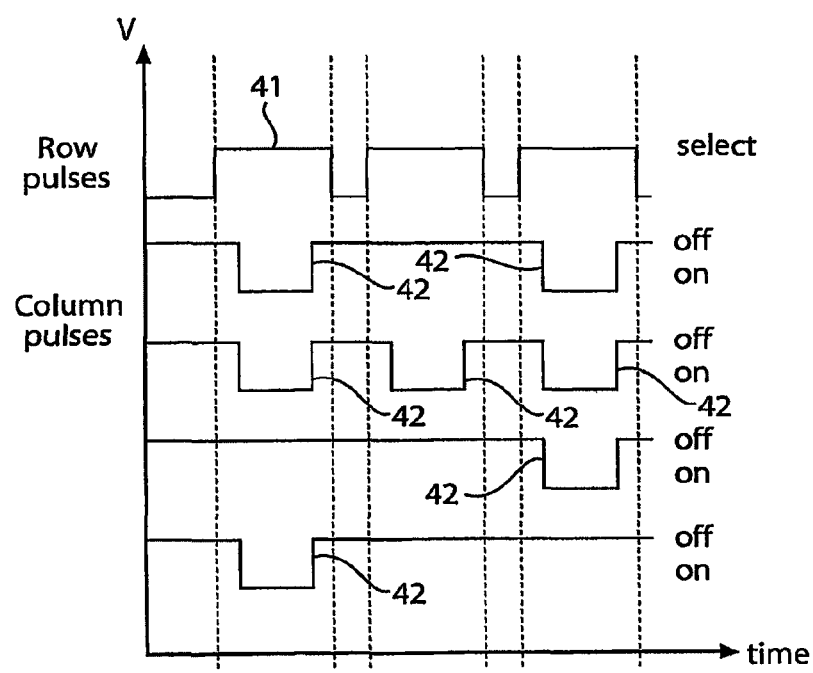
FIG. 4 is a diagram illustrating examples of row and column pulses in a display device according to the invention.
Figure 5A:
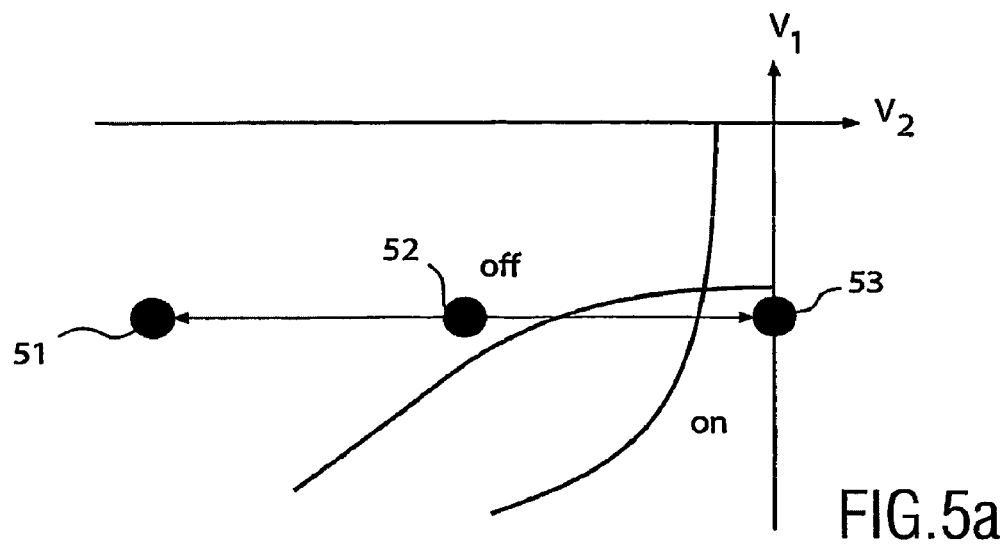
FIGS. 5a and 5b are diagrams illustrating the switching curves of a pixel of foil display according to the embodiments in FIGS. 2 and 3.

FIG. 4 shows how row pulses 41 are applied to one row electrode 26; 27 at a time, in order to select a row. During the duration of this pulse, image data is applied to the columns in the form of column pulses 42 to the column electrodes 24. Only pixels on a selected row can be activated by a column pulse 42.

In the embodiment shown in FIG. 2, i.e. where the foil electrode 17 is structured, a constant DC high voltage (order of 1 kV) is applied to the electrode layer 22 on the light guide 12. At the same time, all row electrodes 26 are held at a raised potential (order of 20 V) while all column electrodes 24 are held at a lowered potential (order of −20 V). The voltage difference ($V_1$) between the foil electrode 17 and the electrode layer 23 attracts the foil 16 towards the front plate 14 (position 51 in FIG. 5a).

Then, the row electrode 26 of a row to be addressed is set to zero potential during a row pulse, thereby reducing the voltage difference $V_1$ along this selected row (position 52 in FIG. 5a), and thus increasing the force towards the light guide exerted on this row. The columns 24 of pixels that should emit light are then also set to zero potential, thereby further reducing (to zero) the voltage difference $V_1$ in such a pixel (position 53 in FIG. 5a), and thus further increasing the force on the pixel. Note that the voltage difference ($V_2$) between the foil electrode 17 and the electrode layer 22 is almost constant, due to the much larger voltage applied to the electrode layer 22. Thus, the positions 51, 52, 53 are essentially located on a horizontal line in FIG. 5a.

Pixels in position 53, where both row and column electrodes are set to zero potential, will not be exposed to any attractive force towards the front plate 14, and the foil will in these places therefore move towards the light guide 12 as a result of the constant attractive force. Other pixels, in positions 51 or 52, will all remain attracted towards the front plate, although to a different extent.

According to this embodiment, a thin light guide plate may therefore be used with relatively low switching voltages on the row and column electrodes.

In the embodiment shown in FIG. 4, the unstructured electrode 17 of the foil 16 is kept as a constant potential. Further, a positive voltage is applied to the column electrodes 24, to thereby attract the foil to the front plate 14, and thus keep all pixels in the off-state (position 54 in FIG. 5b). A row is selected by increasing the voltage difference ($V_1$) between the foil electrode layer 17' and the electrode layer 22', by applying a positive voltage pulse 41 to a row electrode 27. This selection pulse increases the electrostatic force towards the light guide 12, and brings the pixel to state 55 in FIG. 5b.

Figure 5B:
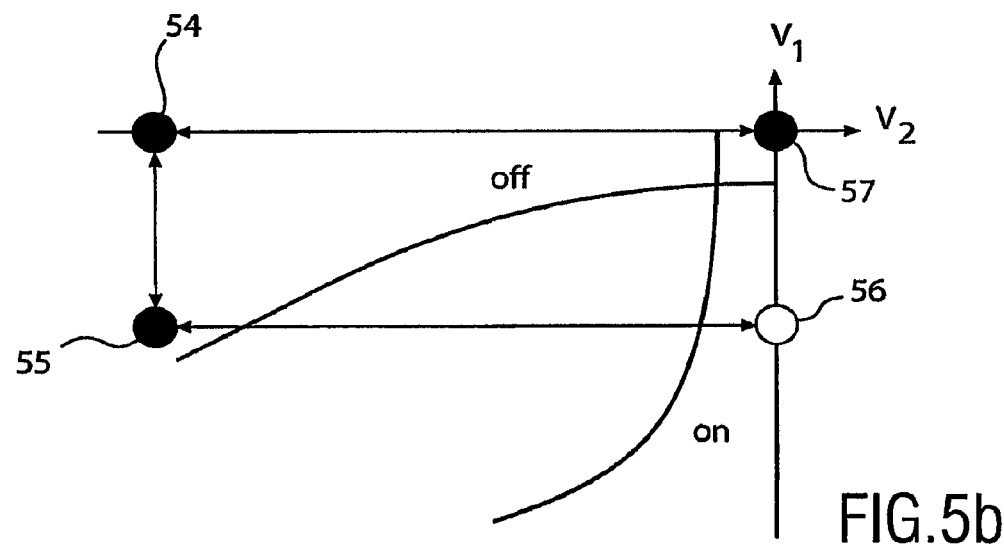

The pixels in such a selected row can now be switched ON, i.e. moved to state 56 in FIG. 5b, by applying a negative pulse 42 to the column electrodes, thereby increasing the voltage difference ($V_2$) between the foil 16 and the electrode layer 23. Pixels in unselected rows may switch to an intermediate state (position 57 in FIG. 5b), but no contact is made with the light guide 12. Thus light is only extracted in a pixel area where a row is selected, and where the column voltage correspond to the on-value. At the end of the row selection pulse 41, the voltage difference $V_1$ is again increased, and all pixels are again attracted to the column plate, i.e. switched to the off-state 51. The following row can now be selected.

Addressing according to this embodiment will require switching of relatively high row voltages (see above) leading to complicated driver electronics.

Figure 6:
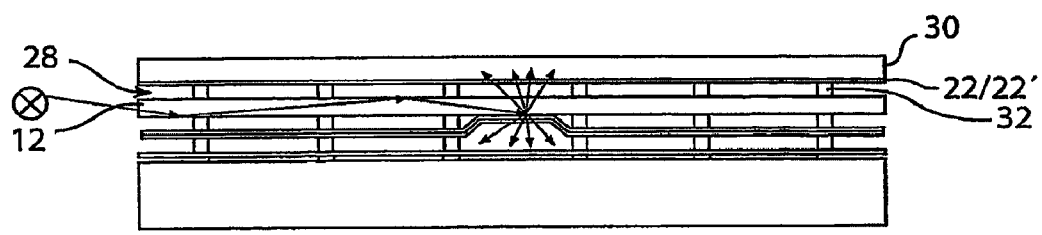
FIG. 6 is a schematic cross section of a display device according to a further embodiment of the present invention.

According to a further embodiment, shown in FIG. 6, the layer 28 can be realized by arranging the electrode layer 22, 22' on a third plate 30, and separating this third plate 30 from the light guide 12 with additional spacers 32. In other words, the layer 28 is in this case an air gap. The distance between the far side of the light guide 12a and the electrode layer 22, 22' should be kept small, preferably in the range 0.1-0.5 μm.

Figure 7A:
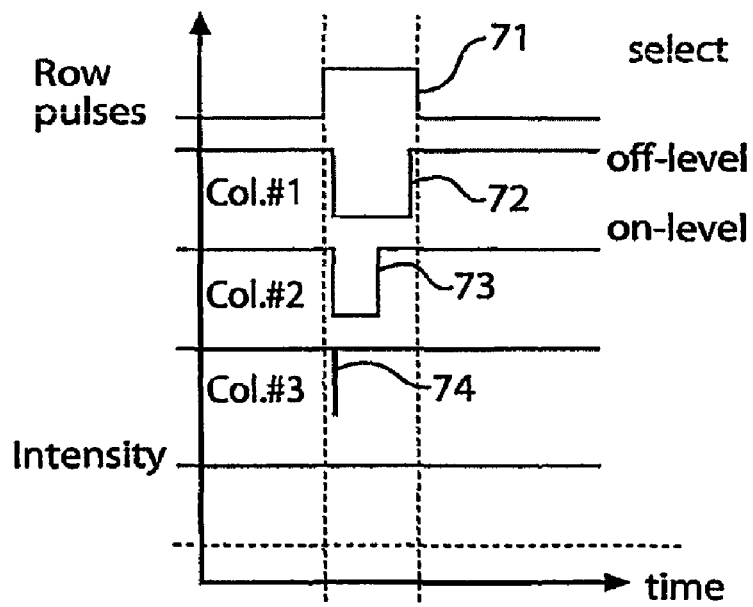
FIGS. 7a and 7b illustrate gray scale generation with a device according to the invention.

When line-at-a-time addressing is implemented, and pixels only remain in the on state for the duration of the column pulse 62, gray scales can be generated by varying the length of the column pulse. This is illustrated in FIG. 7a.

A white pixel corresponds to a column pulse 72 with essentially the same length as the row selection pulse 71, and by reducing the pulse width it is feasible to make lower gray scales, as illustrated by column pulses 73 and 74.

Figure 7B:
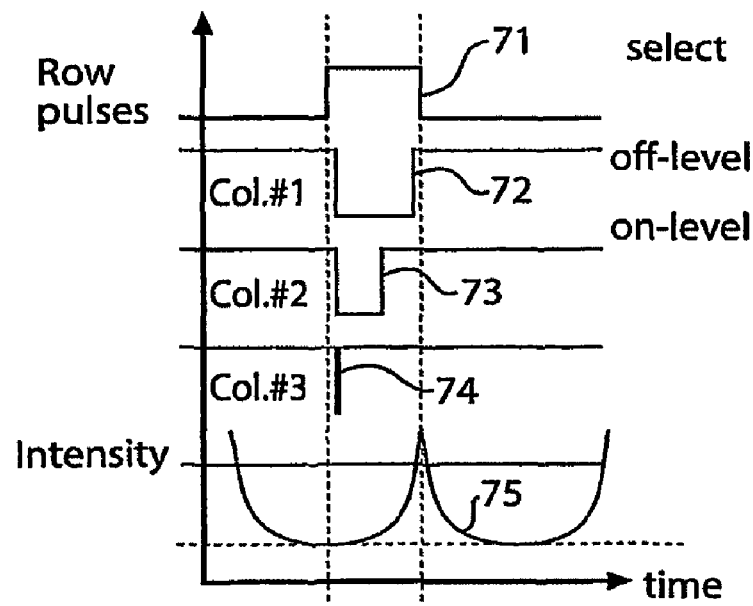

For a VGA display (480 rows) the time available for each row selection pulse is the frame time divided by the numbers of rows, 10 ms/480≈20 μs. In order to generate the required number of different gray levels, it will therefore be necessary to apply column pulses with durations smaller than 1 μs. As shown in FIG. 7b, this issue may be circumvented by a simultaneous modulation of the light intensity 75 during each row selection pulse. This technique is described in more detail in PHNL021414, incorporated herewith by reference. The grayscale level is then again adjusted by varying the length of the pulse 72-74. However, the low intensity 75 of the light source 20 during part of the row selection pulse 71 provides the possibility to generate a low gray scale with a longer pulse width.

An alternative approach for generating gray scales is to modulate the contact area between a pixel and the light guide. In contrast to a conventional foil display, in the display according to the invention the foil is switched by controlling the force towards the light guide, and there is no force towards the front plate present during the switching process. Therefore, modulation of the contact area of a pixel with the light guide can be achieved by simply varying the electrostatic force towards the active plate.

Many variations of the above described embodiments can of course be realized by the skilled person, without departing from the scope of the invention as defined by the claims.

For example, the position of the row and the column electrodes can be exchanged. However, in the embodiment shown in FIG. 4, with high voltage electrodes 26', it is preferable to use these electrodes 26' as row electrodes, as row selection pulses have a much lower duty cycle.

Although line-at-a-time addressing has been used in the described embodiments, the inventive display may also be used with a sub-frame addressing scheme, as a bi-stability still exists. In that case, a light guide 12 of conventional thickness may be used.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for manufacturing a display device, comprising:
   optically coupling a light guide to a light source;
   placing a front plate generally parallel to the light guide, wherein the front plate comprises a first electrode layer disposed on an internal side of the front plate facing a first side of the light guide;
   disposing a refractive layer and a second electrode layer on a second side of the light guide such that the refractive layer is positioned between the second electrode layer and the light guide; and
   arranging a moveable element having a third electrode layer between the light guide and the front plate;
   wherein the first, second, and third electrode layers are configured to enable the moveable element to be moved into and out of contact with the light guide; and
   wherein disposing the refractive layer and the second electrode layer on the second side of the light guide comprises depositing the refractive layer on the light guide and depositing the second electrode layer on the refractive layer.

2. The method of claim 1, wherein disposing the refractive layer and the second electrode layer on the second side of the light guide comprises:
   depositing the second electrode layer on a back plate; and
   disposing the back plate on the second side of the light guide, wherein the refractive layer comprises a gap between the light guide and the back plate.

3. The method of claim 1, wherein two of the first, second, and third electrode layers comprise sets of parallel electrodes arranged orthogonal to one another, and the remaining electrode layer is unstructured.

4. The method of claim 1, wherein optically coupling the light guide to the light source comprises optically coupling a glass plate having a thickness of 0.05-1 mm to the light source.

* * * * *